United States Patent
Roytman et al.

(10) Patent No.: US 10,048,952 B2
(45) Date of Patent: Aug. 14, 2018

(54) COMPILER OPTIMIZED DATA MODEL EVALUATION

(71) Applicant: ORACLE INTERNATIONAL CORPORATION, Redwood Shores, CA (US)

(72) Inventors: Alexey Roytman, Beer-Sheva (IL); Natalia Reichman, Beer-Sheva (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 88 days.

(21) Appl. No.: 14/938,207

(22) Filed: Nov. 11, 2015

(65) Prior Publication Data
US 2017/0131983 A1    May 11, 2017

(51) Int. Cl.
*G06F 9/45* (2006.01)
*G06F 8/41* (2018.01)

(52) U.S. Cl.
CPC .............. *G06F 8/443* (2013.01); *G06F 8/41* (2013.01)

(58) Field of Classification Search
CPC .................................. G06F 8/443; G06F 8/41
See application file for complete search history.

(56) References Cited

U.S. PATENT DOCUMENTS

| | | | | |
|---|---|---|---|---|
| 6,463,582 B1* | 10/2002 | Lethin | ............... | G06F 9/45504 717/138 |
| 8,904,346 B1* | 12/2014 | Strikhalev | ........... | G06F 11/3688 717/108 |
| 2001/0011371 A1* | 8/2001 | Tang | ..................... | G06F 8/41 717/160 |
| 2006/0020933 A1* | 1/2006 | Pasumansky | ..... | G06F 17/30592 717/140 |
| 2008/0222616 A1* | 9/2008 | Cheng | ..................... | G06F 8/51 717/137 |
| 2011/0238978 A1* | 9/2011 | Majumdar | ........... | H04L 63/0428 713/152 |
| 2011/0282847 A1* | 11/2011 | Collins | ............. | G06F 17/30477 707/688 |

OTHER PUBLICATIONS

Pedersen et al. A Powerful and SQL-Compatible Data Model and Query Language for OLAP, 2002.*
http://www.swig.org/; "Welcome to SWIG"; last modified Jan. 31, 2015.
https://en.wikipedia.org/wiki/MultiDimensional_eXpressions; "MultiDimensional eXpressions"; last modified Jun. 7, 2015.

* cited by examiner

*Primary Examiner* — Viva Miller
(74) *Attorney, Agent, or Firm* — Potomac Law Group, PLLC

(57) ABSTRACT

A data model evaluation optimizer is provided that optimizes data model evaluation. An expression of a data model is received that is defined using a domain-specific language, the expression to be evaluated by an application, and the application having been written in a first programming language. New code is dynamically generated in a second programming language by translating the domain-specific language expression into the second programming language. The generated new code is compiled (and optimized) into a compilation of the second programming language. The compilation of the second programming language is made available to the application of the first programming language such that the application evaluates the expression using the compilation.

22 Claims, 4 Drawing Sheets

COMPILER OPTIMIZED DATA MODEL EVALUATION

FIELD

One embodiment is directed generally to a computer system, and in particular to a computer system that optimizes data model evaluation.

BACKGROUND INFORMATION

When dealing with data model evaluation (e.g., static data model evaluation), developers can create complicated optimizing code (e.g., with threaded code, just-in-time compilation ("JIT"), etc.) to evaluate expressions in the data model. However, writing, optimizing, and/or tuning such code can be difficult, tedious, and costly.

SUMMARY

One embodiment is a system that optimizes data model evaluation. The system receives an expression of a data model that is defined using a domain-specific language, the expression to be evaluated by an application, and the application having been written in a first programming language. The system dynamically generates new code in a second programming language by translating the domain-specific language expression into the second programming language. The system compiles the generated new code into a compilation of the second programming language. The compilation can comprise any type of compiled code such as, for example, binary machine code and/or bytecode. The system makes the compilation of the second programming language available to the application of the first programming language such that the application evaluates the expression using the compilation.

DETAILED DESCRIPTION

According to an embodiment, a system is provided that optimizes the evaluation of data modelling expressions. The system translates the expressions into compilable code and compiles the code with an existing optimizing compiler to generate an optimized shared library. The system can load the optimized shared library and call functions defined therein to execute optimized evaluation of the data modelling expressions. The system thereby optimizes the evaluation of data modelling expressions by leveraging optimizations performed by existing optimizing compilers, such as, for example, third-party C/C++ compilers. In addition to optimizing the evaluation of data modeling expressions, the use of existing/third-party compilers saves development costs by reducing or eliminating the time developers might otherwise spend optimizing/tuning/debugging their own code.

In some embodiments, the optimized shared library is compiled by a server such that the optimized shared library can be loaded and executed by a client (e.g., a mobile device). In some such embodiments, the server and client have different platforms (e.g., different processors, architectures, operating systems, and/or runtime libraries), and the server compiles the translated compilable code with an existing/third-party optimizing cross-compiler to generate the optimized shared library such that the optimized shared library can be loaded/executed by the client.

Figure 1:
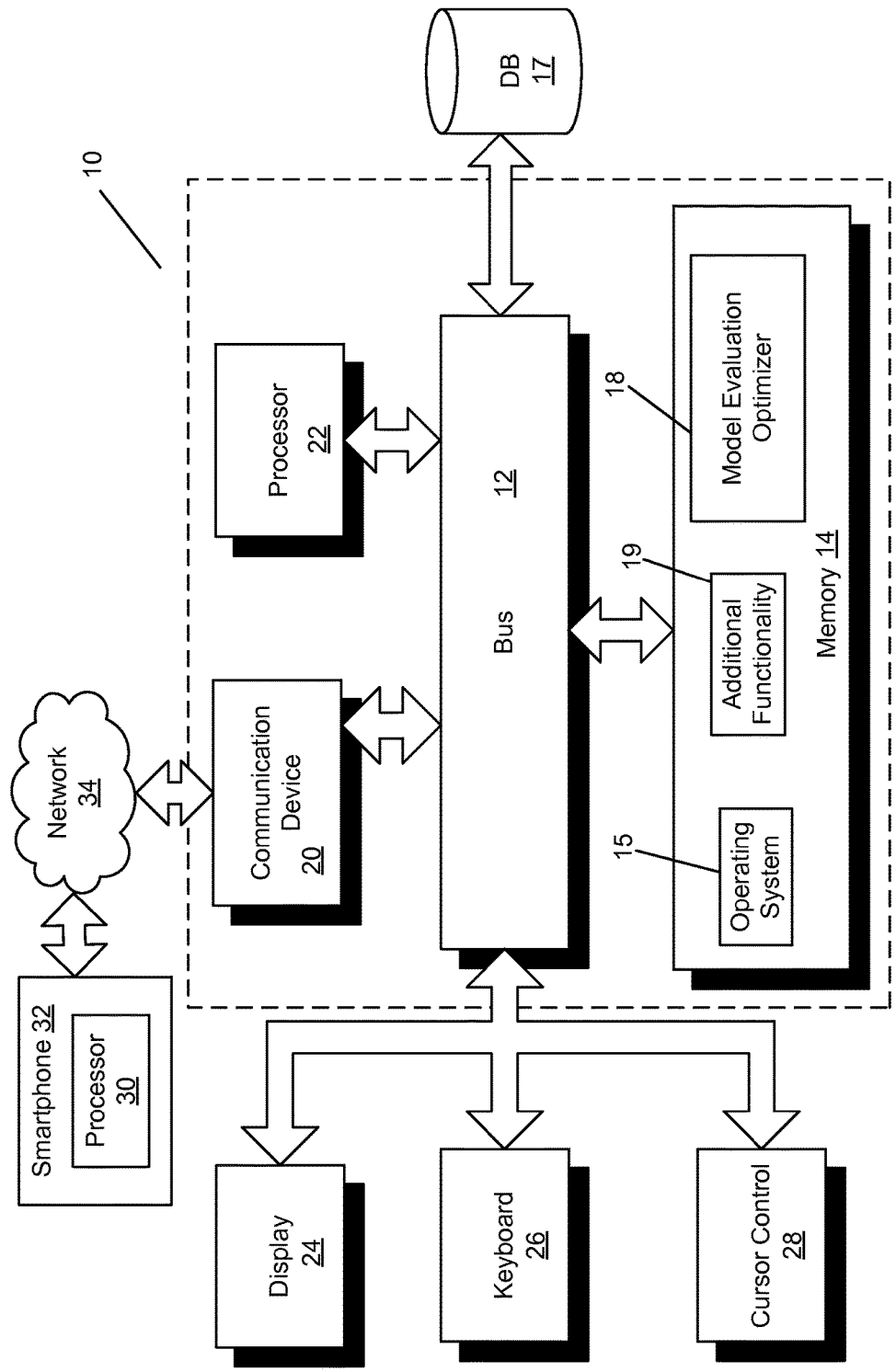
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. In some embodiments, processor 22 may include multiple cores and/or system 10 may include multiple processors. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

Smartphone (or "client") 32 includes a client processor 30 and is coupled via network 34 to communication device 20. Client 32 can be any client device such as a mobile phone, smartphone, tablet, personal digital assistant ("PDA"), desktop computer, laptop computer, etc. In some embodiments, client 32 includes multiple processors. In some embodiments, client 32 may be coupled from time to time to communication device 20 via network 34.

In some embodiments, not all of the components shown in FIG. 1 are included. For example, if system 10 implements a server, then display 24, keyboard 26, and cursor control 28 may not be included in some embodiments. In another example, communication device 20 may not be included in some embodiments such as, for example, if system 10 is not coupled to client 32. In some embodiments, system 10 may be part of a cluster that comprises a plurality of systems such as system 10 to distribute the processing disclosed herein for optimizing data model evaluation across the cluster. In some embodiments, system 10 can be configured as a cloud computing and/or storage solution for performing the processing disclosed herein for optimizing data model evaluation.

In one embodiment, memory 14 stores software modules that provide functionality when executed by processor 22. The modules include an operating system 15 that provides operating system functionality for system 10. The modules further include a model evaluation optimizer 18 that optimizes/manages model evaluation, as disclosed in more detail below. The modules further include one or more functional modules 19 that can include one or more compilers that compile and optimize model evaluation code, as disclosed in more detail below.

For example, functional modules 19 may include one or more compilers, such as the GCC ("GNU Compiler Collection") compilers from Free Software Foundation, the Visual Studio compilers from Microsoft Corporation, the Intel C++ Compiler from Intel Corporation, the Intel Fortran Compiler from Intel Corporation, or any other compiler that can perform optimizations. System 10 can be part of a larger system. Therefore, one or more additional functional modules 19 can include the additional functionality. For example, functional modules 19 may include modules that provide additional functionality, such as a multidimensional online analytical processing ("OLAP") server. In contrast to "on-line transaction processing" ("OLTP"), OLAP defines a database technology optimized for processing human queries rather than transactions.

One example of an OLAP server is the Essbase Server from Oracle Corporation. Essbase is a multidimensional database management system ("MDBMS") that provides a multidimensional database platform upon which to build analytic applications. Although Essbase has been categorized as a general-purpose multidimensional database, it was originally developed to address the scalability issues associated with spreadsheets applications such as Microsoft Excel. In this context, "multidimensional" refers to the representation of data (e.g., financial data) in spreadsheet format. A typical spreadsheet may display time intervals along column headings, and account names on row headings. If a user wants to break down these values by region, for example, this typically involves the duplication of this table on multiple spreadsheets. An alternative representation of this structure would require a three-dimensional spreadsheet grid, giving rise to the idea that "Time", "Account", and "Region" are dimensions. As further dimensions are added to the system, it becomes very difficult to maintain spreadsheets that correctly represent the multi-dimensional values. Multidimensional databases such as Essbase provide a data store for values that exist, at least conceptually, in a multidimensional "hypercube". OLAP systems generally provide for multiple levels of detail within each dimension by arranging the members of each dimension over one or more hierarchies. A time dimension, for example, may be represented as a hierarchy starting with "Total Time", and breaking down into multiple years, then quarters, then months. An Accounts dimension may start with "Profit", which breaks down into "Revenue" and "Expenses", and so on. In the example above, if "Product" represents individual product SKUs, analysts may also want to report using aggregations such as "Product Group", "Product Family", "Product Line", etc. Similarly, for "Customer", natural aggregations may arrange customers according to geographic location or industry.

Essbase supports two "storage options" which take advantage of sparsity to minimize the amount of physical memory and disk space required to represent large multidimensional spaces: block storage option ("BSO") and aggregate storage option ("ASO"). Users can specify calculations in Essbase BSO as: the aggregation of values through dimensional hierarchies; stored calculations on dimension members; "dynamically calculated" dimension members; fully dynamic members (that were not originally a part of dimension) specified in report time (e.g., by using "WITH MEMBER" in MDX language syntax); or procedural "calculation scripts" that act on values stored in the database. The first method (dimension aggregation) may take place implicitly through addition, or by selectively tagging branches of the hierarchy to be subtracted, multiplied, divided or ignored. Also, the result of this aggregation can be stored in the database, or calculated dynamically on demand—members can be tagged as "Stored" or "Dynamic Calc." to specify which method is to be used. The second method (stored calculations) can use a formula against each calculated dimension member—when Essbase calculates that member, the result is stored against that member just like a data value. The third method (dynamic calculation) may be specified in the same format as stored calculations, but calculates a result when a user accesses a value addressed by that member; the system does not store such calculated values. The fourth method (fully dynamic members) can select members that were not originally part of the dimension. The fifth method (calculation scripts) can use a procedural programming language specific to the Essbase calculation engine. This type of calculation may act upon any data value in the hypercube, and can therefore perform calculations that cannot be expressed as a simple formula. A calculation script may also be executed to trigger the calculation of aggregated values or stored calculations as described above—a built-in calculation script (called the "default calculation") can be used to execute this type of calculation.

Fully dynamic members can be specified using, for example, the "WITH MEMBER" clause of the MDX language. An example of the use of the "WITH MEMBER" clause is shown in the following example MDX query:

WITH MEMBER [Measures].[AverageSale] AS '[Measures].[Sales]/[Measures].[Units]'
SELECT {[Measures].[Sales], [Measures].[AverageSale]} ON COLUMNS,
NON EMPTY [Products].MEMBERS ON ROWS
FROM [applicationName].[dbName]
WHERE ([FY15])

The above MDX query calculates average sale for all product having data in financial year 2015, and displays the average sale as a second column (after the total sale column), having products on rows. In this case, "[Measures].[AverageSale]" was not a part of dimension before, but rather is fully dynamic.

Essbase ASO can specify calculations as: the aggregation of values through dimensional hierarchies; dynamically calculated dimension members; or fully dynamic members (e.g. by using "WITH MEMBER" in MDX language syntax). The first method (dimension aggregation) basically duplicates the algorithm used by Essbase BSO. The second method (dynamic calculations) evaluates Multidimensional Expressions ("MDX" expressions) against dimension members or fully dynamic members (e.g. by using "WITH MEMBER" in MDX language syntax).

A database 17 is coupled to bus 12 to provide centralized storage for modules 18 and 19. Database 17 can store data in an integrated collection of logically-related records or files. Database 17 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 is configured to evaluate data models having data modelling formulas, the evaluation of which is optimized/managed by model evaluation optimizer 18. System 10 can translate a data model into a compilable language (e.g., C/C++). System 10 can invoke a third-party optimizing compiler to compile the translated data model code to create a shared library. The shared library can contain entries/functions for evaluation of the data model, and can be loaded (e.g., linked or dynamically loaded on the fly) in a main application being run by system 10 or a client of system 10 such as smartphone 32. System 10 can "outsource" optimization techniques to a third-party tool (e.g., the third-party compiler) that many specialists work on. By leveraging third-party optimizing compilers, the optimization techniques of those compilers (and, for example, the effort of large groups of people who have developed some such compilers) can be leveraged by system 10 to lower development costs, allow a data model evaluator to be developed faster and/or by a smaller team, shorten debugging cycles, and/or improve application performance, which can be a competitive factor. Some optimization techniques employed by such third-party compiler may be not published (e.g., if the compiler is closed-source), and therefore system 10 can benefit from non-published optimization techniques in addition to those that are known.

Figure 2:
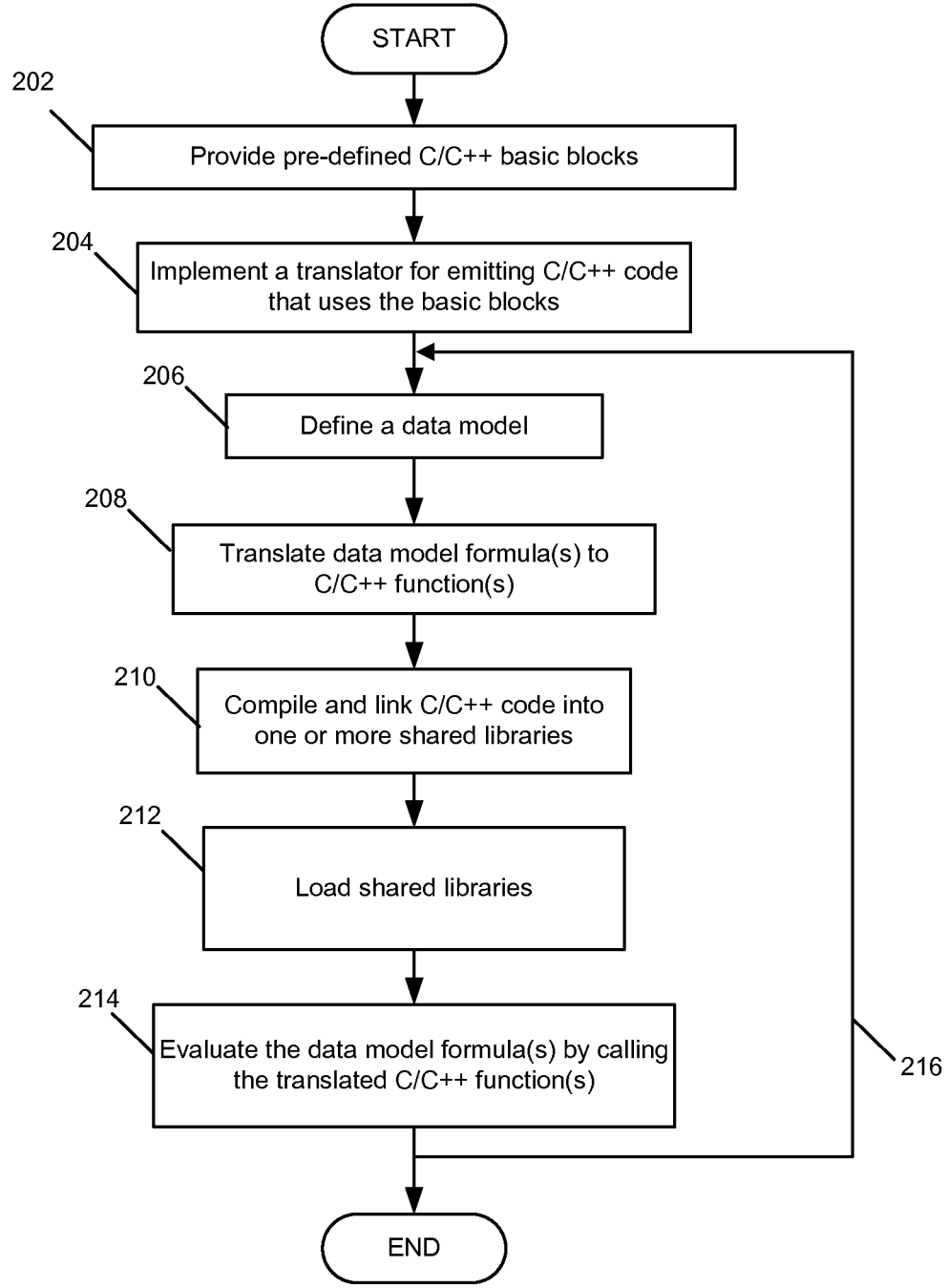
FIG. 2 illustrates a flow diagram of the functionality of optimizing data model evaluation with a C/C++ compiler, in accordance with an embodiment of the invention.
Figure 3:
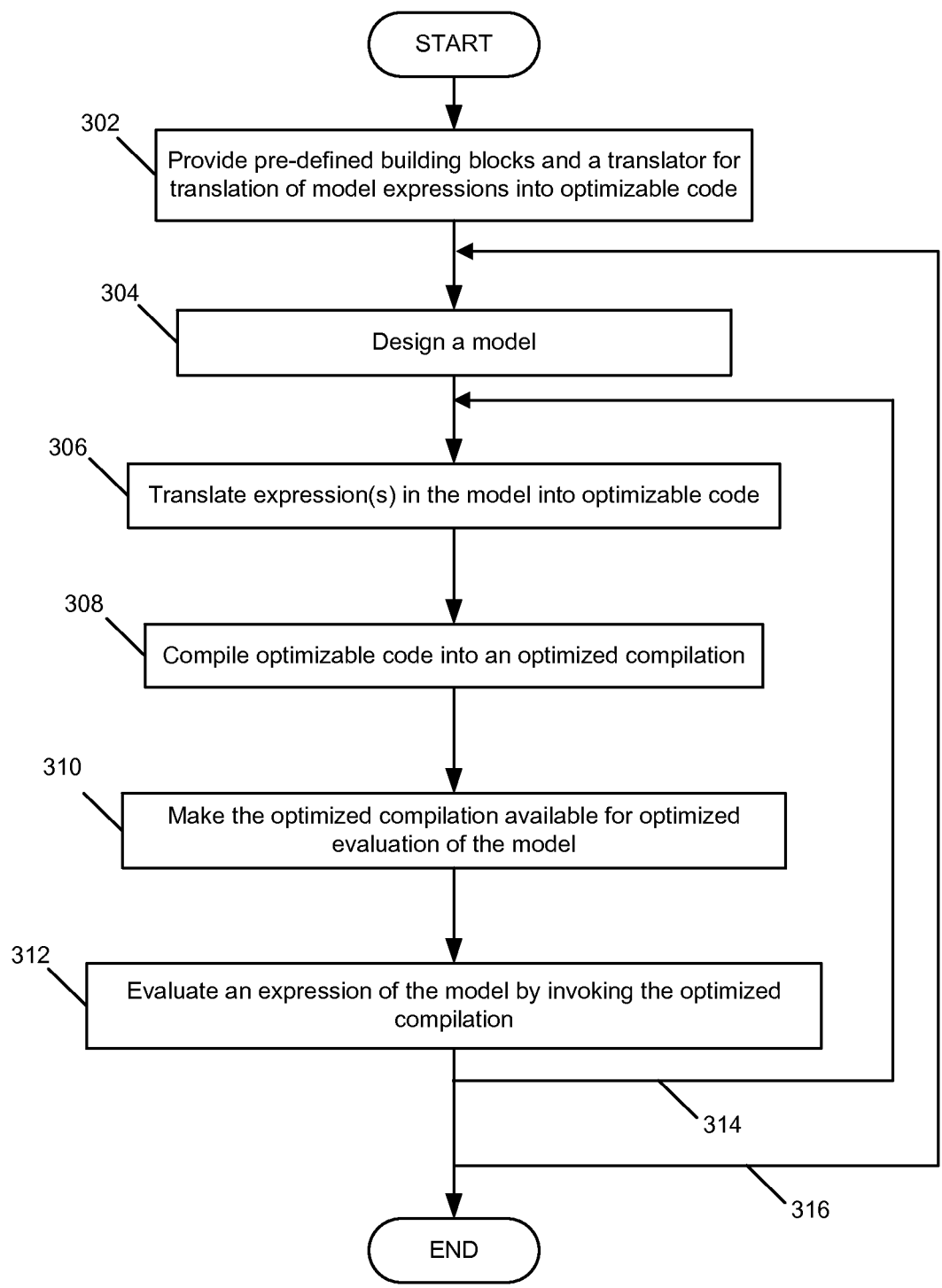
FIG. 3 illustrates a flow diagram of the functionality of optimizing data model evaluation, in accordance with an embodiment of the invention.
Figure 4:
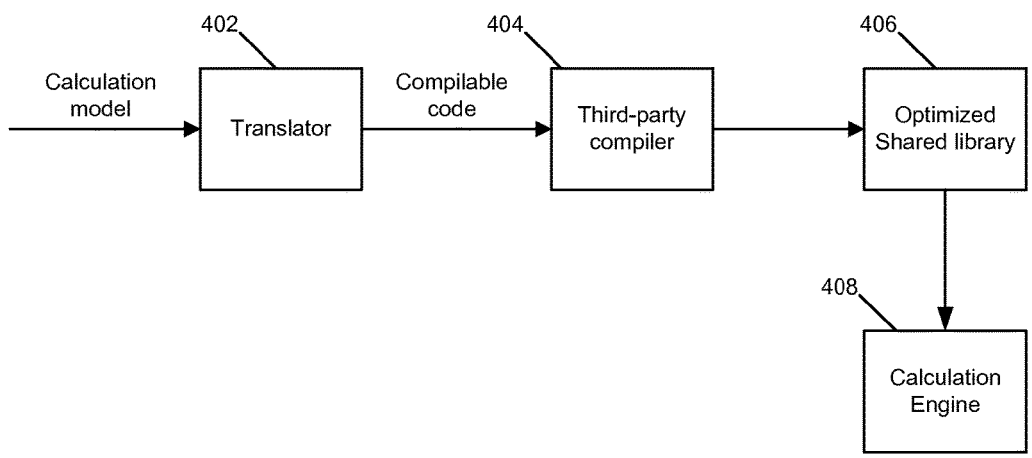
FIG. 4 is a block diagram illustrating a system for optimized data model evaluation, in accordance with an embodiment of the invention.

FIG. 2 illustrates a flow diagram of the functionality of optimizing data model evaluation with a third-party C/C++ compiler, in accordance with an embodiment of the invention. In one embodiment, the functionality of the flow diagram of FIG. 2, and the functionality of the flow/block diagrams of FIGS. 3 and 4 are each implemented by software stored in memory or other computer-readable or tangible medium, and executed by a processor (e.g., a central processing unit ("CPU") and/or a graphical processing unit ("GPU")). In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 202, pre-defined C/C++ basic blocks are provided. These basic blocks can be static and can include, for example, basic functions such as "retrieve a datum". For example, system 10 can be a multi-dimensional online analytical processing ("OLAP") server (e.g., Essbase Server from Oracle Corporation) and the basic blocks can include the following "EssRetrieveCellStored" and "EssRetrieveCellAny" functions for retrieving cells having given member names:

```
/* given an array of 'memberNames' of size 'nDim', retrieve in '*result' a cell with those stored
   member names from current database. On error, returns non-zero status. Error can appear if
   any coordinate is not stored. */ extern "C" int EssRetrieveCellStored(DIMNUM nDim, const char * memberNames[ ], double *
   result);

/* given an array of 'memberNames' of size 'nDim', retrieve in '*result' with those member names
   from current database. On error, returns non-zero status. Member names can refer to
   dynamic members of dimensions. */ extern "C" int EssRetrieveCellAny(DIMNUM nDim, const char * memberNames[ ], double * result);
```

The pre-defined C/C++ basic blocks can be licensed under an open source license or alternatively as proprietary under a closed source license.

At 204, a translator for emitting C/C++ code that uses the basic blocks provided at 202 is implemented. The translator can be configured to generate compilable C/C++ code that evaluates one or more expressions of an existing data modelling language (e.g., MDX expressions).

At 206, a data model is defined.

At 208, data model formula(s) (or expression(s)) are translated to C/C++ function(s). The translator can emit C/C++ code that uses the basic blocks based on the existing data modelling language (e.g., MDX expressions). For example, a single formula of data-modelling can be translated to a single C/C++ function.

In some embodiments such as those discussed above in which system 10 can be a multi-dimensional OLAP server (e.g., Oracle Essbase), system 10 can have a "Period" dimension with a member: "Q1":=("Jan"*31+"Feb"*28+"Mar"*31)/(31+28+31). When translating this domain-specific expression to C/C++ code, the following C/C++ code can be emitted/generated:

```
/* fetch value for "Q1" where 'memberNames' of size 'nDim' contain the rest of the dimensions. */
extern "C" int fetch_generated_Q1(DIMNUM nDim, const char * memberNames[ ], double * result)
{
    int status = 0;
    const char * oldMember;
    DIMNUM myDim = 4; /* dimension number of "Q1" */
    double valTmp = 0.0, val_Jan = MISSING, val_Feb = MISSING, val_Mar = MISSING;
    bool valMissing = 1;
    oldMember = memberNames[myDim];
    memberNames[myDim] = "Jan";
    status = EssRetrieveCellAny(nDim, memberNames, &val_Jan);
    if (status) goto exit;
    memberNames[myDim] = "Feb";
    status = EssRetrieveCellAny(nDim, memberNames, &val_Feb);
    if (status) goto exit;
    memberNames[myDim] = "Mar";
    status = EssRetrieveCellAny(nDim, memberNames, &val_Mar);
    if (status) goto exit;
    if (val_Jan != MISSING) { valTmp += val_Jan*31; valMissing = 0; }
    if (val_Feb != MISSING) { valTmp += val_Feb*28; valMissing = 0; }
    if (val_Mar != MISSING) { valTmp += val_Mar*31; valMissing = 0; }
    if (! valMissing)
        *result = valTmp/(31+28+31);
    else
        *result = MISSING;
exit:
    memberNames[myDim] = oldMember;
    return status;
}
```

The above C/C++ code implements the domain-specific expression discussed above in C/C++ code and references the "EssRetrieveCellAny" basic block discussed above with respect to 202.

In addition to the particular examples described, system 10 can be any system that evaluates complex formulas in domain-specific languages, such as, for example, Structured Query Language ("SQL"), Relational Database Management Systems ("RDBMSes"), MDX in OLAP servers, non-structured databases (e.g., key-value databases), and/or applications built atop of such systems.

At 210, the translated C/C++ code is compiled and linked into one or more shared libraries. The translated code can be compiled by a compiler that supports one or more compiler-design optimizations such as, for example, constant folding (e.g., "(Feb+Feb)/Feb" replaced by "2"; " . . . /(31+28+31)" replaced by "/90"), dead code elimination (e.g., "if (false) {Jan} else {Feb}" replaced by just "{Feb}"), expression simplifications (e.g., "Feb+0" replaced by "Feb"), loop invariant extraction, branch prediction, etc.

At 212, the shared library is loaded. The shared library can be loaded to evaluate the model formula(s) translated into C/C++ at 204.

At 214, one or more of the model formula(s) are evaluated by calling the respective translated C/C++ function(s). The shared libraries can be used by direct calls.

In some embodiments, the model is not static and can be defined by a user in a domain-specific language (e.g., by a business analyst). The functionality of the flow diagram of FIG. 2 can be repeated in whole or in part in order to, for example, update the shared libraries in response to model changes made by the user, as shown, for example, at 216.

In some known systems, formulas in such domain-specific languages are evaluated by very complex techniques that may not be easily optimized. Embodiments of the present disclosure improve the processing of such formulas by, inter alia, translating the formulas in domain-specific languages to a compilable (programming) language such as C/C++ and compiling the translated code using an optimizing compiler, as discussed herein.

In some embodiments, an application with a domain-specific language which may be used for model calculation (e.g., complex model calculations) can include one or more modules to implement some or all of the functionality of FIG. 2 and/or FIG. 3. A translator module (e.g., translator 402 shown in FIG. 4 and described below) translates expressions or formulas of the domain-specific language to compilable code (e.g., C/C++ code). A compiler can be run with optimization options enabled to compile the compilable code generated by the translator module to generate optimized compiled code (or compilation) (e.g., a shared library having binary code or machine code). The optimized compiled code can be loaded by the application and/or a calculation engine (e.g., calculation engine 408 of FIG. 4). In some embodiments the application includes such a calculation engine. Additionally or alternatively, the calculation engine can be separate from the application.

For example, in some embodiments the application with a domain-specific language which can be used for model calculation can be a spreadsheet application. The spreadsheet application can support large spreadsheets with, for example, millions of rows of data. In one such example, a spreadsheet includes millions of rows of data providing sales results of specific products in a current market. The spreadsheet can include a column that lists how much value added tax ("VAT") should be paid to the state for each product. For some products, there is no VAT (e.g., fruits and vegetables in Israel), and the VAT can depend on locality, date of sale, quantity sold, product type, and/or total sum paid for product. In this example, the domain-specific language formula can comprise: get the product, get the product category/type, go to a VAT table to check whether VAT is to be paid for this product category/type and if so add the appropriate VAT to the price of the product.

In another example, a spreadsheet includes geographic coordinates on earth and a column to indicate the largest city that is closest to the geographic coordinates. In this example, the domain-specific language formula can comprise: query a mapping service (e.g., Google Maps) for nearest cities within a certain radius of the geographic coordinates, make a local cache to minimize querying Google Maps, and determine the largest city. In this example, the domain-specific language can include a "getLargestCity" function that performs the functionality to determine the largest city that is closest to given coordinates that can be referenced in the largest city column (e.g., the largest city column can be defined as "=getLargestCity([coordinates-cells])"). In such an example, the translator can be configured to generate C/C++ code for the "getLargestCity" function. The cell(s) in which the coordinates are located can be passed to the "getLargestCity" function as one of more arguments. Basic blocks can be provided that allow for the retrieval of data from given cells of the spreadsheet and the translator can be configured use the basic blocks to access the coordinates in the cell(s) indicated by the function arguments to emit C/C++ code implementing the "getLargestCity" function.

In some embodiments the optimized compiled code is reused and not recompiled unless its respective expression (or an expression upon which it depends) in the domain-specific language is modified by a user. In some embodiments, compilable code for different expressions can be compiled into the same optimized compiled code (e.g., shared library 406 of FIG. 4) if they are dependent. In some embodiments, compilable code for different expressions can be compiled into the same optimized compiled code (e.g., shared library) if the expressions' scope of life is similar (e.g., if they have the same lifetime).

For example, a model can include the following formula set: "{Feb}:={Jan}*1.1; {Mar}:={Feb}*1.2; {Sep}:=−1;". In some embodiments, the formulas for {Feb}, {Mar}, and {Sep} can be compiled into the same shared library or different shared libraries. For example, if the formula set is changed to be "{Feb}:={Jan}*1.05; {Mar}:={Feb}*1.2; {Sep}:=−1;" (i.e., only the formula for {Feb} is updated) and the formulas were compiled into separate libraries, then only the library for the {Feb} formula would be updated, otherwise if all three formulas are included in the same shared library then then the shared library would be updated for all three formulas including those that did not change. If a specific subset of formulas is changed relatively frequently, those formulas can be compiled into separate shared library/libraries, to save the cost of all non-changed expressions' compilation. In this example above, formula for {Feb} can be compiled in one shared library, and formula for {Mar} and {Sep} in another shared library. Alternatively, if maximal optimization is desired despite possible additional compilation and inter-function/global optimization time (e.g., optimization to eliminate dependency of {Mar} on {Feb}, and calculate {Mar} directly from the value of {Jan}), all formulas can be compiled into the same shared library.

FIG. 3 illustrates a flow diagram of the functionality of optimizing model evaluation, in accordance with an embodiment of the invention.

At 302, pre-defined basic blocks and a translator for translation of model expressions into optimizable code are provided. The pre-defined blocks can include code that performs basic functions which can be used by the translator at 306 to translate a model expression into a function defined in the optimizable code, such as, for example, the "EssRetrieveCellStored" and "EssRetrieveCellAny" functions discussed above with respect to FIG. 2. The basic blocks can be written in C/C++ or any other programming language that can be compiled by an optimizing compiler.

At 304, a data model is designed. The data model can include formulas (or expressions) defined using a domain-specific language.

At 306, expressions in the model can be translated into optimizable code. The model expressions can be translated into C/C++ or any other programming language that can be compiled by an optimizing compiler (and for which pre-defined basic blocks have been provided at 302).

In some embodiments, model evaluation optimizer 18 is configured to translate expressions of the data model into optimizable code using, when appropriate, the basic blocks provided at 302. Model evaluation optimizer 18 can receive an expression of the model defined using a domain-specific language. In some embodiments, model evaluation optimizer 18 can be configured to include a translator that parses the data model expression and dynamically generates optimizable code that evaluates the expression using, for example, the basic blocks in the generated code where appropriate, as shown, for example, in the "fetch_generated_Q1" function discussed above with respect to FIG. 2 which references the provided "EssRetrieveCellAny" basic block function. The translator module can be re-used to generate new optimizable code when an expression of the data model has been modified.

In some embodiments, the translation can be performed manually by developers. Such manual translation can also include using the basic blocks provided at 302, as discussed above.

At 308, model evaluation optimizer 18 compiles the translated optimizable code into an optimized compilation. Model evaluation optimizer 18 can be configured to compile the optimizable code into, for example, a shared library by using a third-party and/or separate compiler (which can be included in system 10 as module 19).

At 310, model evaluation optimizer 18 makes the optimized compilation available for optimized evaluation of the model. The optimized compilation can be a shared library that can be loaded by model evaluation optimizer 18 and/or another application to perform optimized evaluation of the model. Model evaluation optimizer 18 can make the optimized compilation available by, for example, placing the optimized compilation at a predetermined location in a file system or memory of system 10.

At 312, an expression of the model is evaluated by invoking the optimized compilation. For example, model evaluation optimizer 18 can evaluate an expression of the model by calling a function defined by the optimized compilation. Additionally or alternatively, another application/module (e.g., application 408 shown in FIG. 4) separate from model evaluation optimizer 18 can evaluate an expression of the model by calling a function defined by the optimized compilation.

In some embodiments, model evaluation optimizer 18 and/or the other application can be written in an interpreted or bytecode programming language such as, for example, the Java or Microsoft Common Intermediate Language based languages (e.g., C#) and the model expressions can be translated into a programming language that is compiled into machine-dependent (e.g., architecture-dependent) machine code such as, for example, C/C++. In some such embodiments, model evaluation optimizer 18 and/or the other application can be written in Java or a Microsoft Common Intermediate Language based language while still taking advantage of optimizations performed by C/C++ compilers when evaluating model expressions by calling the optimized C/C++ functions.

The functionality of the flow diagram of FIG. 3 can be repeated in whole or in part in order to, for example, translate multiple data model formulas and/or update the shared library in response to model changes made by the user, as shown, for example, at 314 and 316, respectively.

FIG. 4 is a block diagram illustrating a system 400 for optimized model evaluation, in accordance with an embodiment of the invention. System 400 can include a translator 402 that can, for one or more data model expressions (or formulas), generate compilable code (e.g., C/C++ code) to be compiled and optimized by a third-party compiler 404 to generate an optimized shared library 406 for optimized evaluation of the expression(s) by calculation engine 408 and/or another application (not shown). In some embodiments, system 400 can perform optimized model evaluation in accordance with the functionality shown in FIGS. 2 and/or 3. Model evaluation optimizer 18 can include translator 402 and/or calculation engine 408, and modules 19 can include compiler 404.

In some embodiments, third-party compiler 404 is executed by a processor (e.g., processor 22 shown in FIG. 1), and calculation engine 408 and optimized shared library 406 are executed by a client processor (e.g., client processor 30). For example, a server (e.g., system 10) can include the processor and a client (e.g., smartphone 32) can include the client processor. The server and client can be coupled to each other via a network (e.g. network 34) which can be any kind of wired or wireless computer network such as, for example, a local area network ("LAN"), a wide area network ("WAN"), the Internet, a Bluetooth connection, a wireless area network ("WLAN"), etc. and any combinations thereof. In some embodiments, the server and client can have different platforms (e.g., different processors, architectures, operating systems, and/or runtime libraries) and the server (processor) can use a cross-compiler as third-party compiler 404 to compile optimized shared library 406 in a format compatible with the client (client processor) (e.g., the client can be a mobile device such as, for example, a mobile phone or tablet). The client (client processor) can receive optimized shared library 406 from the server (processor) via the network. In some embodiments the server does not use a cross-compiler such as, for example, when the server and client have compatible platforms such that native compiler output from the server can be used by the client. Referring back to FIG. 1, in some embodiments, system 10 can be configured as the server and smartphone 32 can be configured as the client.

It will be appreciated that any of the shared libraries and compilations disclosed herein can comprise any type of compiled code such as, for example, binary machine code and/or bytecode. In addition, in the instant specification, a "third-party" compiler may refer to any compiler separate from the module(s) that optimize/manage model evaluation (e.g., model evaluation optimizer 18 shown in FIG. 1). In particular, a "third-party" compiler is not required to be provided by a different entity (e.g., if company X has a compiler product A and company X also implements a module that optimizes/manages model evaluation in accordance with the present disclosure, then compiler A can be referred to as a "third-party" compiler, as used herein).

As disclosed, embodiments comprise a system that optimizes the evaluation of data modelling expressions. The system translates the expressions into compilable code and compiles such code with an optimizing compiler to generate an optimized shared library. The system can load the optimized shared library and call functions defined therein to optimize evaluation of the data modelling expressions. The system thereby optimizes the evaluation of data modelling expressions by leveraging optimizations already implemented in existing optimizing compilers.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage data model evaluation, the managing comprising:
   receiving a domain-specific language database query expression of a domain-specific language of a data model, the domain-specific language database query expression to be evaluated by an application, the application having been written in a first programming language, wherein the database query expression comprises a formula;
   providing predefined code in a general-purpose imperative programming language mapped to model expressions in the domain-specific language;
   dynamically generating new code in the general-purpose imperative programming language by translating the domain-specific language database query expression into the general-purpose imperative programming language based on one or more portions of the predefined code, the new code being compilable;
   compiling the generated new code, using an optimizing compiler, into a compilation of the general-purpose imperative programming language;
   making the compilation of the general-purpose imperative programming language available to the application written in the first programming language such that the application evaluates the domain-specific language database query expression by using the compilation of the general-purpose imperative programming language; and
   executing the compilation of the general-purpose imperative programming language by the processor.

2. The non-transitory computer readable medium of claim 1, wherein
   the general-purpose imperative programming language is one of C or C++, and
   the compilation is machine-dependent executable machine code, the machine-dependent executable machine code being optimized for execution with the application.

3. The non-transitory computer readable medium of claim 2,
   wherein the compiling includes invoking a compiler to compile the generated new code into the machine-dependent executable machine code, and
   wherein the invoking the compiler includes enabling optimization to be performed by the compiler when compiling the generated new code into the machine-dependent executable machine code.

4. The non-transitory computer readable medium of claim 1, wherein the first programming language and the general-purpose imperative programming language are different programming languages.

5. The non-transitory computer readable medium of claim 1, wherein the first programming language is compilable into bytecode and the general-purpose imperative programming language is compilable into machine code.

6. The non-transitory computer readable medium of claim 1, the managing further comprising:
receiving a translator module configured to translate expressions of the domain-specific language into the general-purpose imperative programming language,
the translating including using the received translator module to translate the domain-specific language query expression into the general-purpose imperative programming language.

7. The non-transitory computer readable medium of claim 1, wherein the compilation is a shared library that includes optimized code to evaluate two or more domain-specific language query expressions of the domain-specific language, the two or more domain-specific language query expressions being included in the same shared library based on dependency and/or scope of life.

8. The non-transitory computer readable medium of claim 2,
wherein the application and the optimized compilation are executed by a client processor different from the processor, and
wherein the processor compiles the optimized compilation using a cross-compiler.

9. The non-transitory computer readable medium of claim 8, wherein a server comprises the processor and a client device comprises the client processor, the server being coupled to the client via a network, the client receiving the optimized compilation from the server via the network.

10. The non-transitory computer readable medium of claim 9, wherein the client device is a mobile phone.

11. A computer-implemented method for managing data model evaluation, the computer-implemented method comprising:
receiving a domain-specific language database query expression of a domain-specific language of a data model, the domain-specific language database query expression to be evaluated by an application, the application having been written in a first programming language, wherein the database query expression comprises a formula;
providing predefined code in a general-purpose imperative programming language mapped to model expressions in the domain-specific language;
dynamically generating new code in the general-purpose imperative programming language by translating the domain-specific language database query expression into the general-purpose imperative programming language based on one or more portions of the predefined code, the new code being compilable;
compiling the generated new code, using an optimizing compiler, into a compilation of the general-purpose imperative programming language;
making the compilation of the general-purpose imperative programming language available to the application written in the first programming language such that the application evaluates the domain-specific language database query expression by using the compilation of the general-purpose imperative programming language; and
executing the compilation of the general-purpose imperative programming language by a processor.

12. The computer-implemented method of claim 11, wherein
the general-purpose imperative programming language is one of C or C++, and
the compilation is machine-dependent executable machine code, the machine-dependent executable machine code being optimized for a client processor different from the processor,
wherein the compiling includes invoking a cross-compiler to compile the generated new code into the machine-dependent executable machine code,
wherein the invoking the compiler includes enabling optimization to be performed by the compiler when compiling the generated new code into the machine-dependent executable machine code,
wherein the application and the optimized compilation are executed by the client processor, and
wherein a server comprises the processor and a client device comprises the client processor, the server being coupled to the client via a network, the client receiving the optimized compilation from the server via the network.

13. The computer-implemented method of claim 11, wherein the compilation is a shared library that includes optimized code to evaluate two or more expressions of the domain-specific language, the two or more expressions of the domain-specific language being included in the same shared library based on dependency and/or scope of life.

14. A system comprising:
a memory device configured to store a data model evaluation management module;
a processing device in communication with the memory device, the processing device configured to execute the data model evaluation management module stored in the memory device to manage data model evaluation, the managing comprising:
receiving a domain-specific language database query expression of a domain-specific language of a data model, the domain-specific language database query expression to be evaluated by an application, the application having been written in a first programming language, wherein the database query expression comprises a formula;
providing predefined code in a general-purpose imperative programming language mapped to model expressions in the domain-specific language;
dynamically generating new code in the general-purpose imperative programming language by translating the domain-specific language database query expression into the general-purpose imperative programming language based on one or more portions of the predefined code, the new code being compilable;
compiling the generated new code, using an optimizing compiler, into a compilation of the general-purpose imperative programming language;
making the compilation of the general-purpose imperative programming language available to the application written in the first programming language such that the application evaluates the domain-specific language database query expression by using the compilation of the general-purpose imperative programming language; and
executing the compilation of the general-purpose imperative programming language by the processing device.

15. The system of claim 14, wherein
the general-purpose imperative programming language is one of C or C++, and
the compilation is machine-dependent executable machine code, the machine-dependent executable machine code being optimized for execution with the application, wherein the compiling includes invoking a compiler to compile the generated new code into the machine-dependent executable machine code, and wherein the invoking the compiler includes enabling optimization to be performed by the compiler when compiling the generated new code into the machine-dependent executable machine code.

16. The system of claim 15, further comprising:

a server comprising the processing device, the server being configured to transmit the optimized compilation to a client device via a network.

17. The system of claim 16, wherein the client device comprises a platform different from that of the server, wherein the application and the optimized compilation are executed by the client device, and wherein the compiler is a cross-compiler and the server invokes the cross-compiler to compile the optimized compilation for a target platform being the different platform of the client device.

18. The system of claim 14, wherein the compilation is a shared library that includes optimized code to evaluate two or more expressions of the domain-specific language, the two or more expressions of the domain-specific language query expressions being included in the same shared library based on dependency and/or scope of life.

19. The computer readable medium of claim 9, wherein the data model is associated with data of a multidimensional database, and wherein the server is a multidimensional database management system.

20. The computer-implemented method of claim 12, wherein the data model is associated with data of a multidimensional database, and wherein the server is a multidimensional database management system.

21. The system of claim 17, wherein the data model is associated with data of a multidimensional database, and wherein the server is a multidimensional database management system.

22. The method of claim 11, wherein the first programming language is compilable into byte-code and the general-purpose imperative programming language is compilable into machine code.

* * * * *

UNITED STATES PATENT AND TRADEMARK OFFICE
CERTIFICATE OF CORRECTION

PATENT NO. : 10,048,952 B2  
APPLICATION NO. : 14/938207  
DATED : August 14, 2018  
INVENTOR(S) : Roytman et al.

Page 1 of 1

It is certified that error appears in the above-identified patent and that said Letters Patent is hereby corrected as shown below:

In the Claims

In Column 14, Line 24, in Claim 14, after "system" insert -- , --.
In Column 16, Line 2, in Claim 18, before "being" delete "query expressions".

Signed and Sealed this
Fourteenth Day of May, 2019

Andrei Iancu
*Director of the United States Patent and Trademark Office*